(12) United States Patent
Srinivasan (10) Patent No.: US 10,612,523 B1
(45) Date of Patent: Apr. 7, 2020

(54) OFFSHORE MONOPILE WIND TURBINE WITH TRIANGULAR SUPPORT STRUCTURE

(71) Applicant: Nagan Srinivasan, Missouri City, TX (US)

(72) Inventor: Nagan Srinivasan, Missouri City, TX (US)

( * ) Notice: Subject to any disclaimer, the term of this patent is extended or adjusted under 35 U.S.C. 154(b) by 0 days.

(21) Appl. No.: 16/428,964

(22) Filed: Jun. 1, 2019

(51) Int. Cl.
*F03D 13/25* (2016.01)

(52) U.S. Cl.
CPC .......... *F03D 13/25* (2016.05); *F05B 2240/95* (2013.01)

(58) Field of Classification Search
CPC ...................................................... F03D 13/25
See application file for complete search history.

(56) References Cited

U.S. PATENT DOCUMENTS

| | | | |
|---|---|---|---|
| 8,692,401 B2 | 4/2014 | Roddier et al. | |
| 2006/0104821 A1 | 5/2006 | Hall | |
| 2007/0075547 A1 | 4/2007 | Kothnur et al. | |
| 2008/0292408 A1 | 11/2008 | Kothnur et al. | |
| 2010/0293781 A1 | 11/2010 | Foo et al. | |
| 2011/0006538 A1 | 1/2011 | Fischer et al. | |
| 2011/0037264 A1* | 2/2011 | Roddier | B63B 35/44 290/44 |
| 2011/0074155 A1 | 3/2011 | Scholte-Wassink | |
| 2011/0142682 A1 | 6/2011 | Gevers | |
| 2012/0263545 A1 | 10/2012 | Oestergaard et al. | |
| 2012/0266796 A1 | 10/2012 | Roodenburg et al. | |
| 2012/0299376 A1* | 11/2012 | Schaefer | F03D 13/22 307/9.1 |
| 2014/0064856 A1* | 3/2014 | Westergaard | B63B 35/003 405/204 |
| 2015/0044045 A1 | 2/2015 | Mendez Alverez | |
| 2015/0071711 A1* | 3/2015 | Wong | E02B 17/00 405/226 |
| 2015/0125220 A1* | 5/2015 | Glukhovskoy | E02B 17/027 405/227 |
| 2015/0136006 A1 | 5/2015 | Rodriguez Tsouroukdissian | |
| 2015/0147174 A1* | 5/2015 | Couchman | F03D 7/047 416/1 |
| 2016/0021834 A1* | 1/2016 | Asker | A01G 15/00 239/14.1 |

(Continued)

*Primary Examiner* — Sean Gugger
(74) *Attorney, Agent, or Firm* — Kenneth A. Roddy (57) ABSTRACT

An offshore monopile wind turbine having an elongate monopile column formed of a lower section, an intermediate section, and an upper section, secured together by connecting collars. A triangular support structure having a triangular three-sided bottom portion extends horizontally outward from one side of the lower connecting collar includes a first pair of lower horizontal tubular beams diverging outwardly with outer ends welded to a respective vertical skirt pile sleeve, a third tubular beam extending between the skirt pile sleeves. An upper pair of tubular beams diverge outwardly and downwardly from the upper connecting collar and are welded to a respective skirt pile sleeve. A horizontal wind turbine platform and elongate wind turbine tower secured to the top end of the elongate upper section of the monopile column includes a nacelle at the top of the turbine tower includes a rotor with three rotor blades.

9 Claims, 5 Drawing Sheets

(56) References Cited

U.S. PATENT DOCUMENTS

| | | | |
|---|---|---|---|
| 2016/0114863 A1* | 4/2016 | Cermelli | B63B 22/04 |
| | | | 441/133 |
| 2016/0130779 A1 | 5/2016 | Van Dijk | |
| 2016/0369780 A1* | 12/2016 | Aubault | F03D 13/25 |
| 2017/0152672 A1* | 6/2017 | Santucci | F03D 13/22 |
| 2017/0167101 A1 | 6/2017 | Bartminn | |
| 2019/0024635 A1 | 1/2019 | Siegfriedsen | |

* cited by examiner

OFFSHORE MONOPILE WIND TURBINE WITH TRIANGULAR SUPPORT STRUCTURE

BACKGROUND OF THE INVENTION

1. Field of the Invention

This invention relates generally to offshore wind turbines, and, more particularly to an offshore monopile wind turbine with a triangular support structure having angular beams and braces supported by two skirt piles in addition to the monopile column, horizontal mud mats supported at the mudline, and internal ring stiffeners in the monopile column to reduce stress riser locations where stress is concentrated at the main joints.

2. Background Art

Support structures for offshore wind turbines play an important role not only in the engineering performances but also in the total capital cost and the project executing time. Geotechnical soil conditions, the dynamic response of the wind turbine and the installation complexity are involved with the selection of the appropriate support structure.

For shallow water depths, the most commonly used support structures are a monopile and a jacket structure. For water depths up to 50 meters, a monopile structure is typically used and for water depths above 50 meters a jacket type support structure is used. The monopile support structure is typically the most popular offshore wind turbines such as in the North Sea. The monopile offers superior advantages when considering the installation time, and the ease of installation. For example, a typical jacket support structure may take 24 to 36 hours to install a platform; whereas a monopile installation may take 12 hours.

Figure 1:
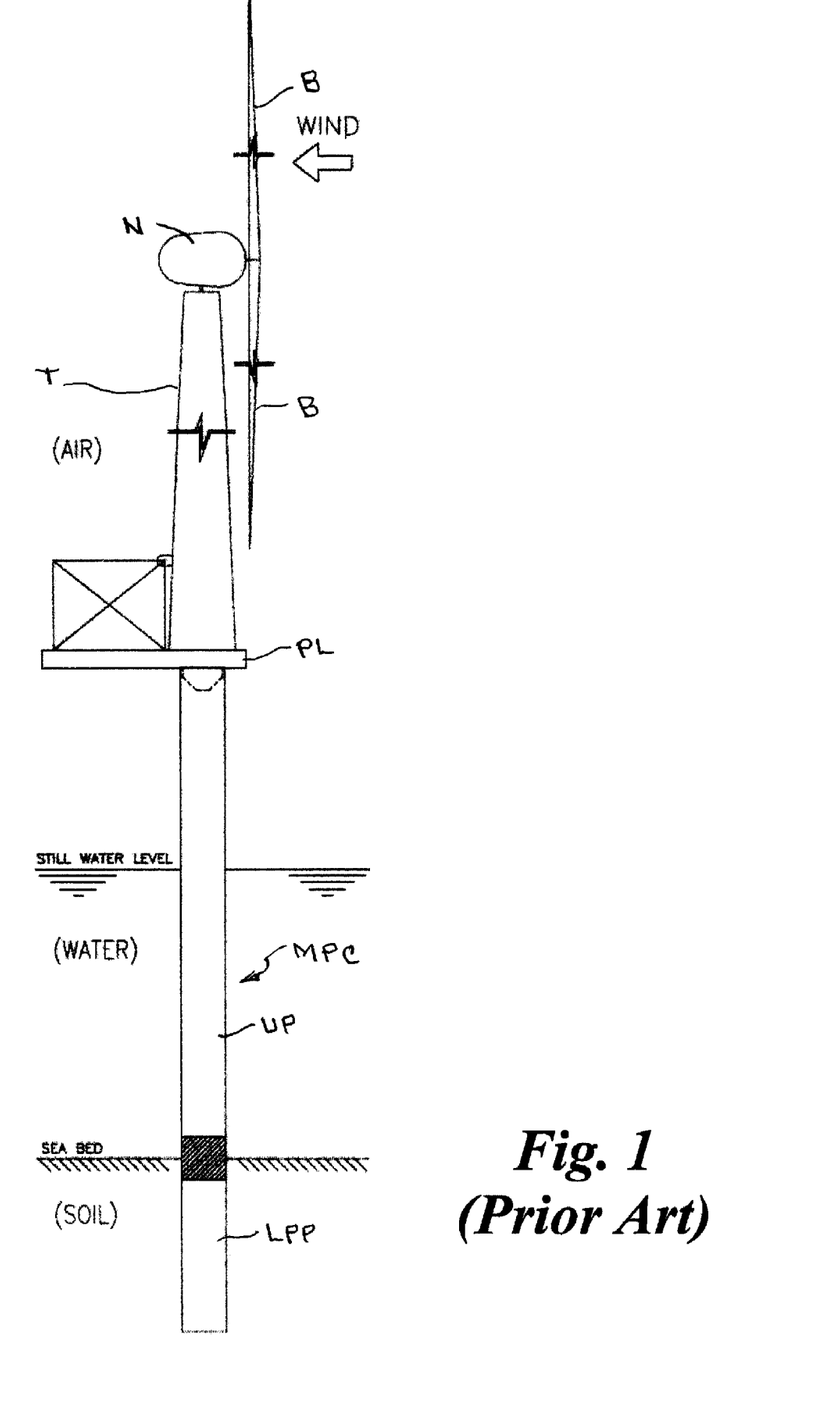
FIG. 1 is a schematic side elevation view of a conventional prior art offshore monopile wind turbine installation.

FIG. 1 shows a typical conventional offshore monopile wind turbine installation of the prior art. The main components of the conventional wind turbine include an elongate large diameter steel monopile column MPC having a lower or pile portion LPP which is driven a distance into the seabed soil and an elongate upper portion UP with a wind turbine platform PL mounted at an upper end thereof. A wind turbine tower T is supported on the platform PL. A nacelle N is mounted on top of the tower T. The nacelle N comprises a rotor with a number of rotor blades B, typically three blades.

In a conventional offshore monopile wind turbine installation the monopile column is a pure cantilever with large unsupported length including the tower and may be installed in poor topsoil seabed strata, and is subjected a variety of complex loading and stress forces.

The conventional prior art offshore monopile wind turbine column is subject to overturning moment forces and lateral loads that are more critical than the axial vertical loads. The maximum occurrence of the loads in the service life of the wind turbine support structure is known as "Ultimate Limit State" or (ULS) load. The ULS failure (which can also be described as a catastrophic collapse) can be of two types: (a) where the soil fails; (b) where the pile fails by forming a plastic hinge. The second type of load is a "Serviceability Limit State or (SLS) load based on the estimate of the natural frequency of the entire system with the turbine, blades and the upper turbine support tower. In SLS failure, the deformation will exceed the allowable limits standards. The third type of load consideration is "Fatigue Limit State" or (FLS) which is the possibility of failure due to the effect of long term cyclic loading and the long term criteria where the fatigue life is to be satisfied compared to the required life of the wind turbine support structure, such as when the tilt angle exceeds the allowable design criteria.

Deformation of the monopile increases with the height above the seabed and the maximum displacement occurs at the top of the upper tower structure in the lateral direction. For an example, the tower height may be 95 meters (about 312 feet) and the water depth 20 meters (about 65.6 feet) and maximum tide 12.5 meters (about 41 feet) with a soft soil clay top layer of 10 meters (about 32 feet), the overall unsupported cantilever height of the monopile for that offshore installation with an appropriate air-gap could be over 140 meters (about 459 feet). The effective length for the monopile cantilever column, would be calculated to be two times the length or about 280 meters (about 918.6 feet), according to the AISC (American Institute Of Steel Construction) structural design criteria.

A typical conventional prior art offshore monopile wind turbine installation at a site with a maximum high tide of, for example, 12.5 meters (about 41 feet) with a 9.5 meter (about 31 feet) soft clay topsoil surface layer on the seabed would require a 6 meter (about 19.9 foot) diameter monopile main column to resist bending and shear forces.

SUMMARY OF THE INVENTION

The present invention overcomes the aforementioned problems and is distinguished over the prior art in general, and a conventional offshore monopile wind turbine installation in particular, by an offshore monopile wind turbine with a triangular support structure, which has an elongate steel monopile column formed of a lower section, an intermediate section, and an upper section, a top end of the lower section secured to a bottom end of the intermediate section by a cylindrical lower connecting collar, which in one embodiment contains an internal an internal stiffener ring, and a top end of the intermediate section secured to a bottom end of the top section by a cylindrical lower connecting collar, which in one embodiment contains an internal stiffener ring.

The triangular support structure has a triangular three-sided bottom portion extending horizontally outward from one side of the lower connecting collar, the bottom portion formed of a first pair of lower horizontal tubular beams welded at one end to the lower connecting collar and diverging angularly outwardly therefrom and the outer ends thereof are each welded to a respective vertical skirt pile sleeve, and a third lower horizontal tubular beam welded at each end to the respective skirt pile sleeves to extend therebetween and complete the horizontal triangular configuration. A second pair of lower horizontal tubular beams are welded at one end to a mid-portion of the third lower horizontal tubular beam and diverge outwardly therefrom and their opposed outer ends are each welded to a respective one of the first pair of lower horizontal tubular beams that diverge outwardly from the lower connecting collar, the second pair of lower horizontal tubular beams defining a pair of triangular openings that extend inwardly from outer corners of the horizontal triangular bottom portion.

A pair of mudmats are secured to the underside of the lower horizontal tubular beam and diverging lower horizontal tubular beams, and span the triangular openings at the outer corners of the horizontal triangular bottom portion. An upper pair of tubular beams and welded at one end to the upper connecting collar and diverge angularly outward and downward therefrom and their outer ends are each welded to a respective skirt pile sleeve above its connection with the lower horizontal tubular beams, and a pair of tubular knee brace members are each welded at one end to the lower connecting collar and diverge angularly upward and outward therefrom and their outer ends are each welded to a respective one of the upper pair of tubular beams.

A pair of pair of elongate vertical guide plates are welded onto diametrically opposed sides of the intermediate section of the monopile column above the upper connecting collar and extend a short distance radially outward therefrom in a plane parallel to the horizontal plane of the third horizontal tubular beam of the triangular three-sided bottom portion of the support structure to aid and facilitate properly positioning the triangular three-sided bottom portion of the support structure during installation.

A horizontal wind turbine platform is secured to the top end of the elongate upper section of the monopile column and an elongate wind turbine tower is secured a bottom end to the platform, a nacelle is mounted on top of the turbine tower and the nacelle includes a rotor with three rotor blades.

The lower, intermediate, and upper sections of the monopile column and the triangular three-sided support structure are assembled together as a single unit onshore and transported to the installation site and the lower section of the monopile is driven into the seabed soil until the triangular three-sided bottom section of the support structure is supported on the seabed and thereafter, skirt piles are driven into the seabed soil through the skirt pile sleeves at the outer corners of the triangular three-sided bottom portion of the support structure. Alternatively, suction pile anchors may be used depending upon the seabed soil conditions.

The wind turbine support platform and elongate wind turbine tower are assembled together as a single unit onshore, and the turbine hook-up and pre-commissioning work may also be completed onshore. The turbine support platform with the turbine tower assembled thereon are supported on the decks of two float-over barges that are spaced a distance apart and towed to the installation site. The float-over barges position the support platform with the turbine tower assembled thereon above the upper section of the previously installed monopile column and then ballasted and their draft is increased such that the support platform and wind turbine tower are supported on the upper section of the monopile column at the installation site. Thereafter, the support platform is welded to the upper section of the monopile column.

One of the significant differences and advantages of the present invention is invention is that because the main monopile column itself piled to the seabed, it provides excellent stability to the triangular support structure, and the triangular support structure redistributes the bending moment of the main monopile column at the foundation to axial forces to the seabed.

Another advantage of the invention is that the two additional skirt piles reduces the pile penetration depth requirement and makes clay layers effective in load transfer at the foundation and provides better distribution of soil resistance loads for a long term service life of the wind tower support structure, and the mudmats supported by the horizontal beams at the mudline provide soil resistance to prevent driving the main pile column further into the seabed soil than is required and also ensure that the support structure has a stable settling on the sea floor.

Another advantage of the invention is that the internal stiffener rings in the collars connecting the sections of the main monopile column reduce the stress risers (stress concentrations) at the main joints due to the brace members connected to the main column.

Another advantage of the invention is that the triangular support structure transfers bending moment loads into axial loads in the soil media.

Another advantage of the invention is that it significantly reduces turbine support deformation at the top of the wind turbine support tower.

Another advantage of the invention is that the unsupported length of the monopile is reduced and the diameter of the monopile column may be about the same or less than half the size of a conventional monopile column.

Another advantage of the invention is that it allows the structural components to have a smaller diameter and which can be economically fabricated at an onshore location close to the installation site and reduce high transportation costs.

Other differences and advantages of the invention will become apparent from time to time throughout the specification and claims as hereinafter related.

DETAILED DESCRIPTION OF THE INVENTION

As used herein, in conjunction with the present invention, the following terms have the following meanings. The term "truss" means a structure that consists of members organized into connected triangles so that the overall assembly behaves as a single object. A truss is made up of a web of triangles joined together to enable the even distribution of weight and the handling of changing tension. The term "tubular" means long, round, and hollow like a tube. The term "knee brace"

means a diagonal member placed across the angle between two members that are joined to stiffen and strengthen a framework so constructed.

Referring to the drawings by numerals of reference, there is shown in FIGS. 2-6, an offshore monopile wind turbine with a triangular support structure in accordance with the present invention, designated generally as 10, secured to a seabed.

Figure 2:
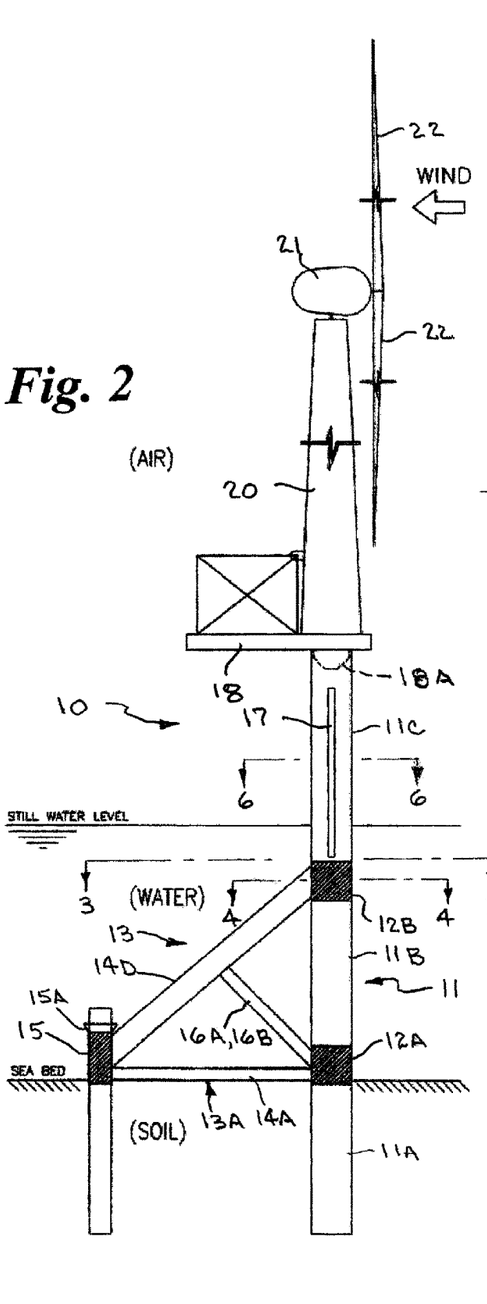
FIG. 2 is a schematic side elevation view of the offshore monopile wind turbine and support structure in accordance with the present invention having a columnar wind turbine tower.

The monopile wind turbine 10 includes an elongate large diameter steel monopile column 11 having a lower section 11A, an intermediate section 11B, and an upper section 11C secured together by a lower connecting collar 12A and an upper connecting collar 12B. The connecting collars 12A and 12B are each relatively short cylindrical members.

Figure 4:
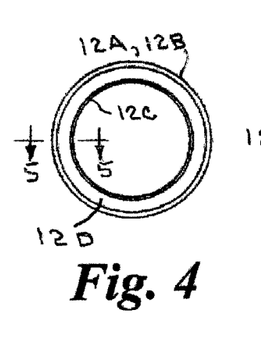
FIG. 4 is a transverse cross sectional view through the monopile structure taken along line 4-4 of FIG. 2, showing an internal stiffener ring inside the connecting collar members.
Figure 5:
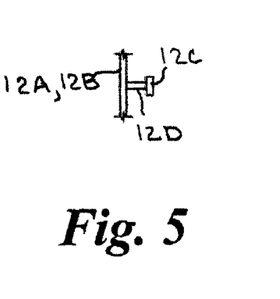
FIG. 5 is a vertical cross sectional view through a portion of the internal stiffener ring, taken along line 5-5 of FIG. 4.

As seen in FIGS. 4 and 5, each connecting collar 12A and 12B may have a concentric internal stiffener ring 12C of a smaller diameter which is spaced inwardly from the inside diameter of the collar and secured to the interior side wall of the of the respective collar by a flat disk 12D welded therebetween. Referring again to FIG. 2, the top end of the lower section 11A of the monopile column 11 is received in the lower end of the lower connecting collar 12A and secured thereto by welding. The bottom end of the intermediate section 11B of the monopile column 11 is received in the top end of the lower connecting collar 12A and secured thereto by welding. The top end of the intermediate section 11B of the monopile column 11 is received in the lower end of the upper connecting collar 12B and secured thereto by welding.

Alternatively as described hereinafter, the internal stiffener ring 12C and flat disk 12D may be eliminated from the connecting collars 12A and 12B when anchoring the main monopile column 11 with an internal pile P inserted though the top end of the monopile column.

Figure 3:
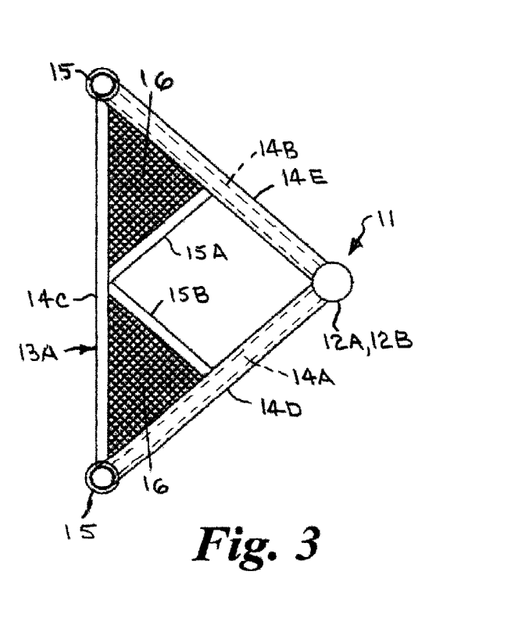
FIG. 3 is a schematic top plan view of the support structure taken along line 3-3 of FIG. 2.

The monopile wind turbine 10 also includes triangular support structure 13 which includes a triangular three-sided bottom portion 13A that extends horizontally outward from one side of the lower connecting collar 12A. The bottom portion 13A is formed of a pair of horizontal tubular beams 14A and 14B that are welded at one end to the lower connecting collar 12A and diverge angularly outwardly therefrom and their outer ends are each welded to a respective vertical skirt pile sleeve 15. Each skirt pile sleeve 15 may have a flared top end portion 15A to aid in inserting a skirt pile SP through the sleeve. Alternatively, a suction pile anchor may be used depending upon the seabed soil conditions. A third horizontal tubular beam 14C is welded at each end to the respective skirt pile sleeves 15 to extend therebetween and complete the horizontal triangular configuration.

A second pair of horizontal tubular beams 15A and 15B are welded at one end to the mid portion of the third horizontal tubular beam 14C and diverge outwardly therefrom and their opposed ends are each welded to a respective one of the horizontal tubular beams 14A and 14B that diverge outwardly from the lower connecting collar 12A. The second pair of horizontal tubular beams 15A and 15B define a pair of triangular openings that extend inwardly from the outer corners of the horizontal triangular bottom portion 13. A pair of triangular mudmats 16 are secured to the underside of the horizontal tubular beams 14A, 14B, 14C, and span the triangular opening at the outer corners of the horizontal triangular bottom portion 13.

The triangular support structure 13 further includes an upper pair of tubular beams 14D and 14E that are welded at one end to the upper connecting collar 12B and diverge angularly outward and downward therefrom and their outer ends are each welded to a respective skirt pile sleeve 15 above its connection with the lower horizontal tubular beams 14A, 14B, and 14C. A pair of tubular knee brace members 16A and 16B are each welded at one end to the lower connecting collar 12A and extend diverge angularly upward and outward therefrom and their outer ends are each welded to a respective one of the upper pair of tubular beams 14D and 14E.

The upper pair of tubular beams 14D and 14E may be larger in diameter than the lower horizontal tubular beams 14A, 14B, and 14C of the triangular three-sided bottom portion 13 and the knee brace members 16A and 16B. As an example, but not limited thereto, the upper pair of tubular beams 14D and 14E may be approximately 6 feet in diameter and have a wall thickness of approximately 3 inches, and the lower horizontal tubular beams 14A, 14B, and 14C of the triangular three-sided bottom portion 13 and the knee brace members 16A and 16B may be approximately 3 feet in diameter and have a wall thickness of approximately 2 inches. The diameters of the beams and braces are recited for the purpose of example only and should not be considered to be limited to those stated.

Figure 6:
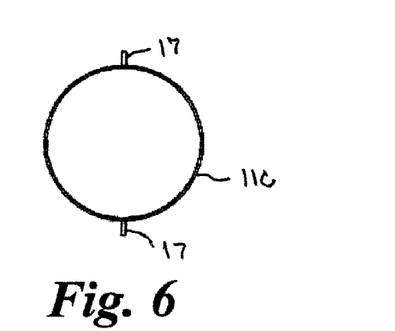
FIG. 6 is a transverse cross sectional view through the monopile structure taken along line 6-6 of FIG. 2, showing a pair of pair of diametrically opposed vertical guide plates on opposed sides of the upper section of the monopile to facilitate positioning and pile driving.

As shown in FIGS. 2 and 6, a pair of pair of elongate vertical guide plates 17 are welded onto diametrically opposed sides of the intermediate section 11B of the monopile column 11 above the upper connecting collar 12B and extend a short distance radially outward therefrom in a plane parallel to the horizontal plane of the third horizontal tubular beam 14C of the triangular three-sided bottom portion 13A of the support structure 13. The vertical guide plates 17 aid and facilitate properly positioning the triangular three-sided bottom portion of the support structure during installation (described hereinafter).

The lower, intermediate, and upper sections 11A, 11B, and 11C of the monopile column 11, and the triangular three-sided support structure 13 are secured together as a single unit prior to installation.

Figure 7:
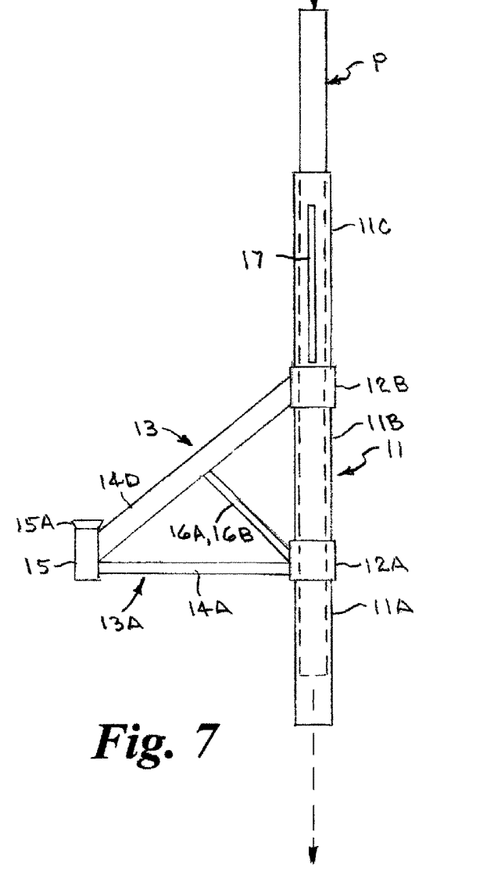
FIG. 7 is a schematic side elevation view of the monopile column showing an alternative internal pile anchor inserted though the top section of the monopile column.

Alternatively, as shown in FIG. 7, the internal stiffener ring 12C and flat disk 12D may be eliminated from the connecting collars 12A and 12B when the main of the monopile column 11 is anchored with an internal pile inserted though the top end of the monopile column.

Referring again to FIG. 2, a horizontal rectangular wind turbine platform 18 and an elongate wind turbine tower 20 are supported at the top end of the elongate upper section 11C of the monopile column 11. In the illustrated example, the turbine tower 20 is a conical tubular steel tower with its diameter increasing towards its base. A nacelle 21 is mounted on top of the turbine tower 20. The nacelle 21 comprises a rotor with a three rotor blades 22 (two of which are shown). A stabbing member 18A is secured to the bottom side of the support platform 18 and extends a short distance downwardly therefrom and is received in in the top end of the upper section 11C of the monopile column 11.

Figure 8:
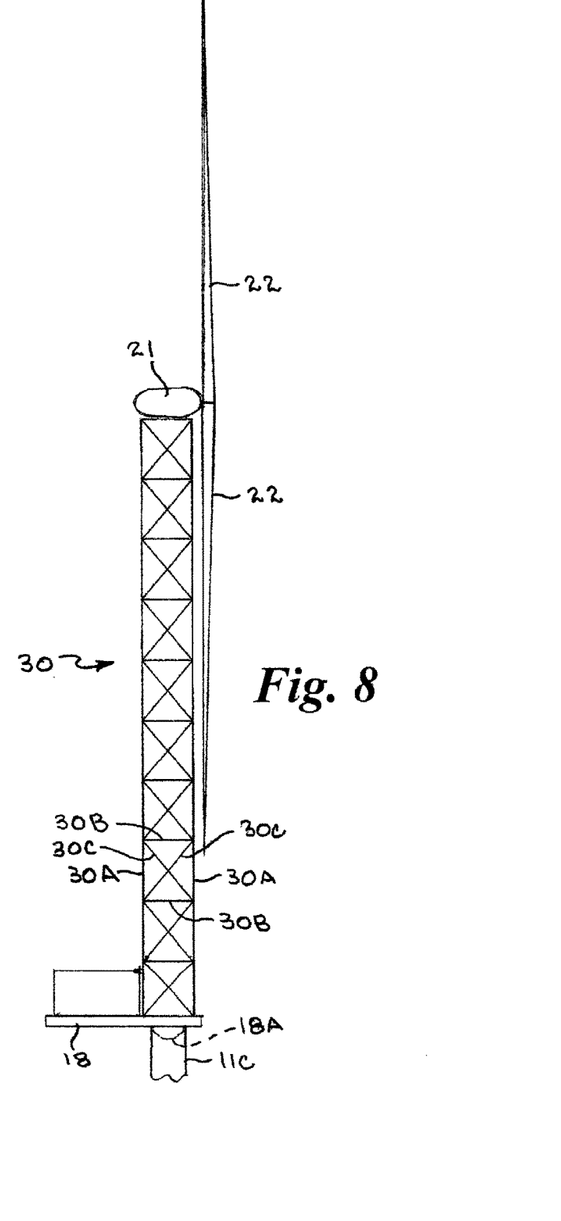
FIG. 8 is a schematic side elevation view of an alternative lattice truss wind turbine tower installed on the top section of the monopile column.

Alternatively, as shown in FIG. 8 the wind turbine tower may be an elongate lattice truss wind turbine tower 30 formed of vertical leg members 30A with vertically spaced horizontal chord members 30B connected by diagonal stiffening cross members 30C extending between the intersections of the vertical legs and horizontal chord members.

In the following discussion, reference numerals of all of the components of the monopile column 11 and the triangular three-sided support structure 13 described above are not shown or described in detail since they have been described in detail above, and the wind turbine tower 20 that is illustrated for purposes of example is the columnar tower embodiment. It should be understood that the wind turbine tower may be the alternative lattice truss wind turbine tower 30 described above.

Figure 9:
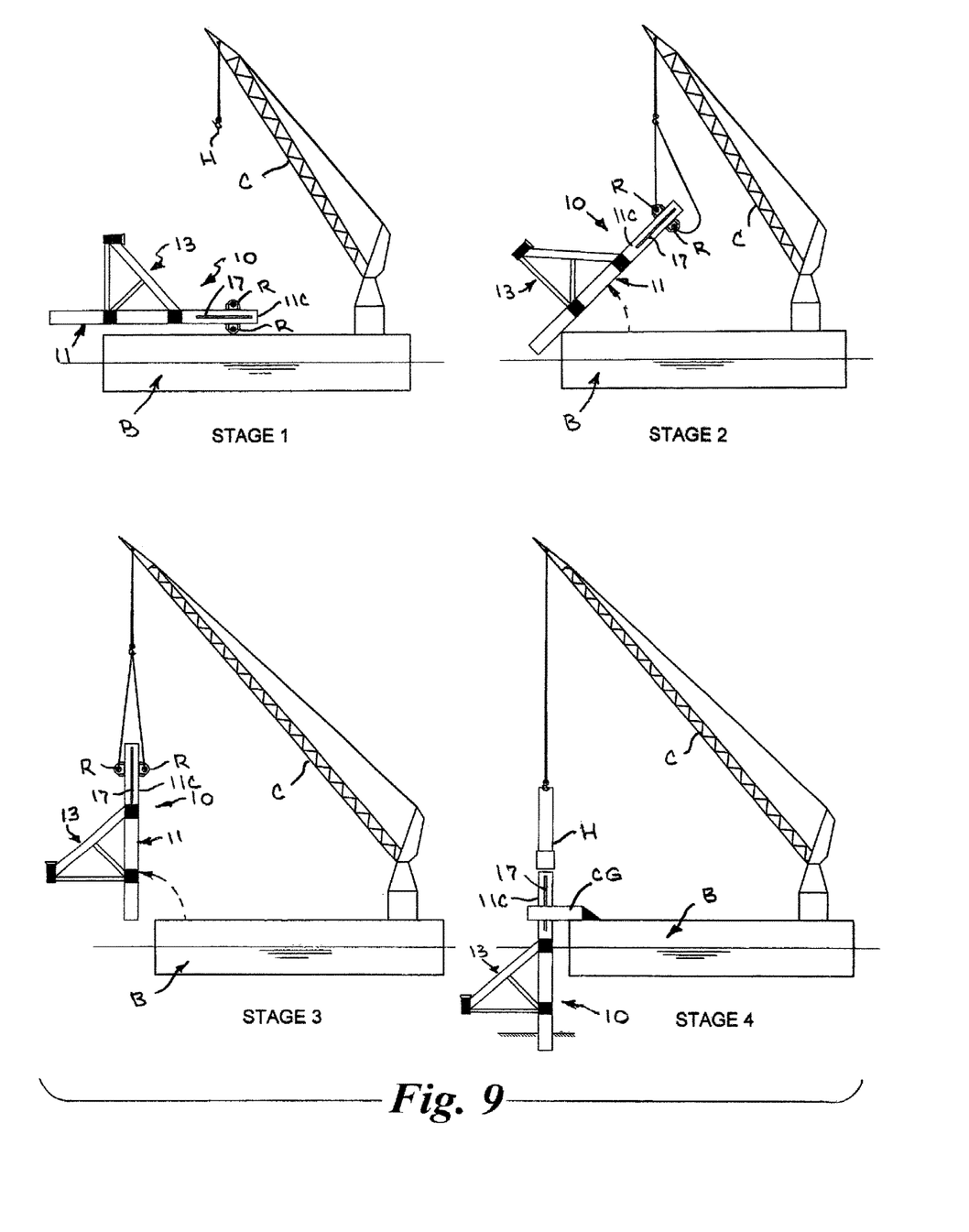
FIG. 9 is a series of schematic side elevation views, illustrating the stages of transporting and installing the monopile and support structure of FIG. 2.

Referring now to FIG. 9, the lower, intermediate, and upper sections of the monopile column 11, and the triangular three-sided support structure 13 are assembled together as a single unit onshore. In stage 1, the upper section 11C is provided with lift rings R and the preassembled unit is towed to the installation site on the deck of a barge B equipped with a crane C having a hook H. In stage 2, the top end of the preassembled unit is lifted upwardly from the deck of the barge B by the crane, such that the preassembled is supported in a vertical upright position a distance from the front of the barge, as shown in stage 3. In stage 4, a clamp and guide member CG extending from the deck of the barge B is a clamped around the upper section 11C of the monopile column. The jaws of the clamp and guide member CG has a pair of laterally opposed slots (not shown) that receive the diametrically opposed vertical guide plates 17 on opposed sides of the upper section 11C of the monopile column. A hydraulic hammer H supported by the crane C is lowered onto the top of the monopile column and it is driven into the seabed soil. The diametrically opposed vertical guide plates 17 on opposed sides of the upper section 11C of the monopile column aid in properly positioning the triangular three-sided bottom section of the support structure 13. Alternatively as described above, the monopile column 11 may be anchored by driving an internal pile though the interior of the monopile column. Thereafter, skirt piles are driven into the seabed soil through the skirt pile sleeves 15 at the outer corners of the triangular three-sided bottom portion of the support structure 13. Alternatively, suction pile anchors may be used depending upon the seabed soil conditions.

Figure 10:
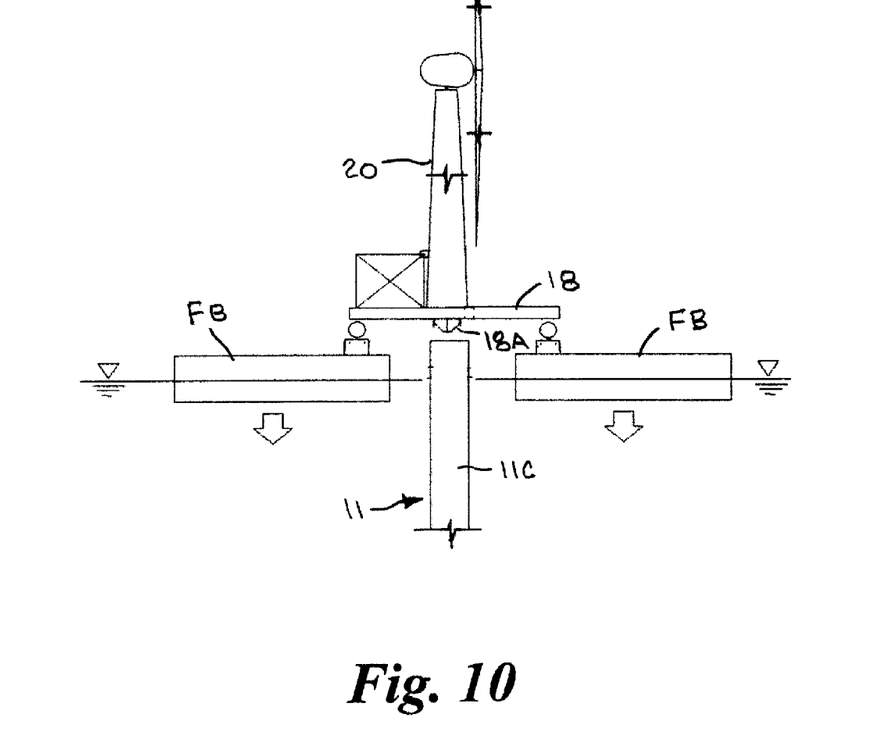
FIG. 10 is a series of schematic side elevation views, illustrating the stages of installing the wind turbine platform and tower on the monopile and support structure.

As shown in FIG. 10, the wind turbine support platform 18 and elongate wind turbine tower 20 are assembled together as a single unit onshore. The turbine hook-up and pre-commissioning work may also be done onshore prior to transporting the assembly to the installation site. Two laterally opposed sides of the assembled support platform 18 and turbine tower 20 are supported on the decks of two float-over barges FB, respectively, that are spaced a distance apart and towed to the installation site. The float-over barges FB position the support platform 18 above the previously installed upper section 11C of the monopile column 11 such that the stabbing member 18A on the bottom side of the support platform 18 is axially aligned with upper section 11C of the monopile column. The float-over barges FB are then ballasted and their draft is increased such that the stabbing member 18A is received within the interior of the upper section 11C of the monopile column, and the support platform 18 and wind turbine tower 20 are supported on the upper section of the monopile column at the installation site. Thereafter, the support platform 18 is welded to the upper section 11C of the monopile column.

The float-over installation method significantly reduces both the duration and cost of the offshore commissioning phase and eliminates the need for large cranes to carry out heavy lift operations.

The three leg arrangement and load transfer to the foundation to the soil media of the present invention reduces the pile penetration requirement. The unsupported cantilever of the main monopole column may be reduced which allows reduced sizes of the main monopole column. For example, a typical conventional prior art offshore monopile wind turbine installation at a site with a maximum high tide of, for example, 12.5 meters (about 41 feet) with a 9.5 meter (about 31 feet) soft clay topsoil surface layer on the seabed would require a 6 meter (about 19.9 foot) diameter monopile main column to resist bending and shear forces, whereas with the present invention, a 3 meter (about 9.8 foot) diameter monopile main column may be used because the support structure transfers the bending moment into axial forces into the seabed and the clay top layer soil in the seabed, and takes the axial load via skin friction.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. An offshore monopile wind turbine with a triangular support structure, comprising:
    an elongate steel monopile column formed of a lower section, an intermediate section, and an upper section, a top end of the lower section secured to a bottom end of the intermediate section by a cylindrical lower connecting collar, and a top end of the intermediate section secured to a bottom end of the top section by a cylindrical lower connecting collar;
    the triangular support structure having a triangular three-sided bottom portion extending horizontally outward from one side of the lower connecting collar, the bottom portion formed of a first pair of lower horizontal tubular beams welded at one end to the lower connecting collar and diverging angularly outwardly therefrom and the outer ends thereof are each welded to a respective vertical skirt pile sleeve, and a third lower horizontal tubular beam welded at each end to the respective skirt pile sleeves to extend therebetween and complete the horizontal triangular configuration;
    a second pair of lower horizontal tubular beams welded at one end to a mid-portion of the third lower horizontal tubular beam and diverging outwardly therefrom and having opposed outer ends each welded to a respective one of the first pair of lower horizontal tubular beams that diverge outwardly from the lower connecting collar, the second pair of lower horizontal tubular beams defining a pair of triangular openings that extend inwardly from outer corners of the horizontal triangular bottom portion;
    a pair of mudmats secured to the underside of the lower horizontal tubular beam and diverging lower horizontal tubular beams, and spanning the triangular openings at the outer corners of the horizontal triangular bottom portion;
    an upper pair of tubular beams welded at one end to the upper connecting collar and diverging angularly outward and downward therefrom and having outer ends each welded to a respective skirt pile sleeve above its the connection of the respective skirt pile sleeve with the lower horizontal tubular beams, and a pair of tubular knee brace members each welded at one end to the lower connecting collar and diverging angularly upward and outward therefrom and having outer ends each welded to a respective one of the upper pair of tubular beams;

a pair of elongate vertical guide plates welded onto diametrically opposed sides of the intermediate section of the monopile column, respectively, above the upper connecting collar and extending a short distance radially outward therefrom in a plane parallel to the horizontal plane of the third horizontal tubular beam of the triangular three-sided bottom portion of the support structure to aid and facilitate properly positioning the triangular three-sided bottom portion of the support structure during installation; and a horizontal wind turbine platform secured to the top end of the elongate upper section of the monopile column and an elongate wind turbine tower secured a bottom end to the platform, a nacelle mounted on top of the turbine tower, the nacelle including a rotor with three rotor blades.

2. The offshore monopile wind turbine with a triangular support structure according to claim 1, wherein the upper pair of tubular beams of the support structure are larger in diameter than the lower horizontal tubular beams of the triangular three-sided bottom portion and the knee brace members.

3. The offshore monopile wind turbine with a triangular support structure according to claim 2, wherein the upper pair of tubular beams of the triangular support structure are approximately 6 feet in diameter and have a wall thickness of approximately 3 inches, and the lower horizontal tubular beams of the triangular three-sided bottom portion and the knee brace members are approximately 3 feet in diameter and have a wall thickness of approximately 2 inches.

4. The offshore monopile wind turbine with a triangular support structure according to claim 1, wherein the upper connecting collar and the lower connecting collar each have a concentric internal stiffener ring spaced inwardly from the inside diameter thereof of and secured to the interior side wall of the of the respective collar by a flat disk welded therebetween, the top end of the lower section of the monopile column received in the lower end of the lower connecting collar and secured thereto by welding, and the bottom end of the intermediate section of the monopile column received in the top end of the lower connecting collar and secured thereto by welding, and the top end of the intermediate section of the monopile column received in the lower end of the upper connecting collar and secured thereto by welding.

5. The offshore monopile wind turbine with a triangular support structure according to claim 1, wherein the lower, intermediate, and upper sections of the monopile column, and the triangular three-sided support structure are secured together as a single unit prior to installation.

6. The offshore monopile wind turbine with a triangular support structure according to claim 1, wherein the wind turbine tower is selected from the group consisting of a conical tubular steel tower having a diameter increasing towards a base of the conical tubular steel tower, and an elongate lattice truss wind turbine tower formed of vertical leg members with vertically spaced horizontal chord members connected by diagonal stiffening cross members extending between the intersections of the vertical legs and horizontal chord members.

7. The offshore monopile wind turbine with a triangular support structure according to claim 1,
wherein the lower, intermediate, and upper sections of the monopile column and the triangular three-sided support structure are assembled together to form a single unit onshore;
the upper section is provided with lift rings and the preassembled unit is towed to the installation site on the deck of a barge equipped with a crane having a hook;
the top end of the preassembled unit is lifted upwardly from the deck of the barge by the crane such that the preassembled unit is supported in a vertical upright position a distance from the front of the barge;
a clamp and guide member extending from the deck of the barge is clamped around the upper section of the monopile column, the clamp and guide member having a pair of jaws with laterally opposed slots that receive the diametrically opposed vertical guide plates on opposed sides of the upper section of the monopile column to properly align and position the triangular three-sided bottom section of the support structure above the seabed and the installation site;
a hydraulic hammer supported by the crane is lowered onto the top of the monopile column upper section and the lower section of the monopile is driven into the seabed soil until the triangular three-sided bottom section of the support structure is supported on the seabed; and
thereafter, the skirt pile sleeves at outer corners of the triangular three-sided bottom portion of the support structure are anchored to the seabed by driven skirt piles or by suction piles, depending upon the seabed soil conditions.

8. The offshore monopile wind turbine with a triangular support structure according to claim 1,
wherein the lower, intermediate, and upper sections of the monopile column and the triangular three-sided support structure are assembled together to form a single unit onshore;
the upper section is provided with lift rings and the preassembled unit is towed to the installation site on the deck of a barge equipped with a crane having a hook;
the top end of the preassembled unit is lifted upwardly from the deck of the barge by the crane such that the preassembled unit is supported in a vertical upright position a distance from the front of the barge;
a clamp and guide member extending from the deck of the barge is clamped around the upper section of the monopile column, the clamp and guide member having a pair of jaws with laterally opposed slots that receive the diametrically opposed vertical guide plates on opposed sides of the upper section of the monopile column to properly align and position the triangular three-sided bottom section of the support structure on the seabed at the installation site;
an elongate pile is lowered the crane though the interior of the monopile column;
a hydraulic hammer supported by the crane is lowered onto the top of the pile and the pile is driven through the monopile column into the seabed soil; and
thereafter, the skirt pile sleeves at outer corners of the triangular three-sided bottom portion of the support structure are anchored to the seabed by driven skirt piles or by suction piles, depending upon the seabed soil conditions.

9. The offshore monopile wind turbine with a triangular support structure according to claim 8, wherein the wind turbine support platform, the elongate wind turbine tower, and the nacelle are assembled together as a single unit and pre-commissioned onshore;

two laterally opposed sides of the assembled support platform with the turbine tower assembled thereon are supported on the decks of two float-over barges, respectively, that are spaced a distance apart and towed to the installation site;

the float-over barges position the support platform with the turbine tower assembled thereon above the upper section of the previously installed monopile column such that the vertical axis of the turbine tower is axially aligned with vertical axis of the upper section of the monopile column;

the float-over barges are then ballasted and their draft is increased such that the support platform and wind turbine tower are supported on the upper section of the monopile column at the installation site; and thereafter the support platform is welded to the upper section of the monopile column.

* * * * *